June 6, 1950          H. BLUE          2,510,677

TRAILER HITCH

Filed Oct. 23, 1947

Inventor
Harry Blue
By Eugene E. Stevens
His Attorney

Patented June 6, 1950

2,510,677

UNITED STATES PATENT OFFICE 2,510,677

TRAILER HITCH

Harry Blue, Coldwater, Mich., assignor of one-half to Melvin L. Blue, Quincy, Mich.

Application October 23, 1947, Serial No. 781,631

3 Claims. (Cl. 280—33.17)

The present invention relates to improvements in trailer hitches.

An important object of the invention is to provide a trailer hitch which is simple in construction, easy to operate, relatively inexpensive to manufacture, and formed of a minimum number of parts.

Another object of the invention is to provide a trailer hitch in the form of a drawbar combining means for quickly releasing and locking the stud of a trailing vehicle.

A further object of the invention is to provide a trailer hitch for towing vehicles comprising a drawbar adapted for attachment to the towing vehicle, said drawbar being provided with a locking slide and releasing wedge mounted in one end thereof for firmly locking and quickly releasing the stud forming a part of the vehicle being towed.

The above and other objects of the invention will in part be obvious and will in part be hereinafter more fully pointed out.

In the drawing—

Figure 1:
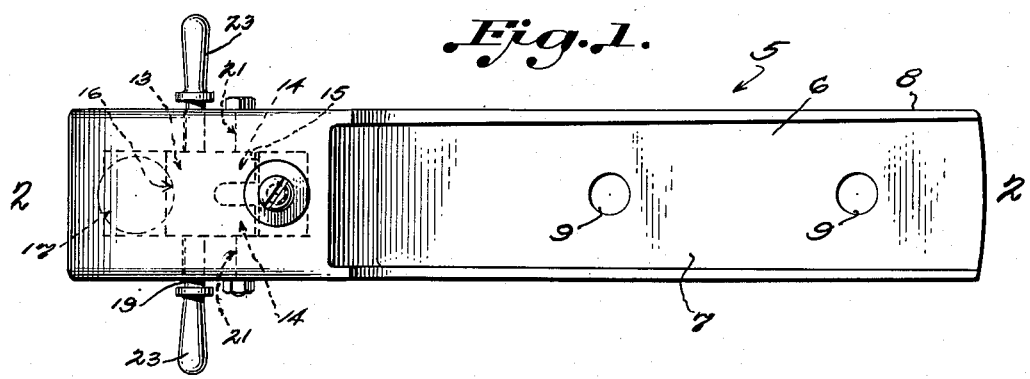
Figure 1 is a top plan view of the new and improved trailer hitch.
Figure 2:
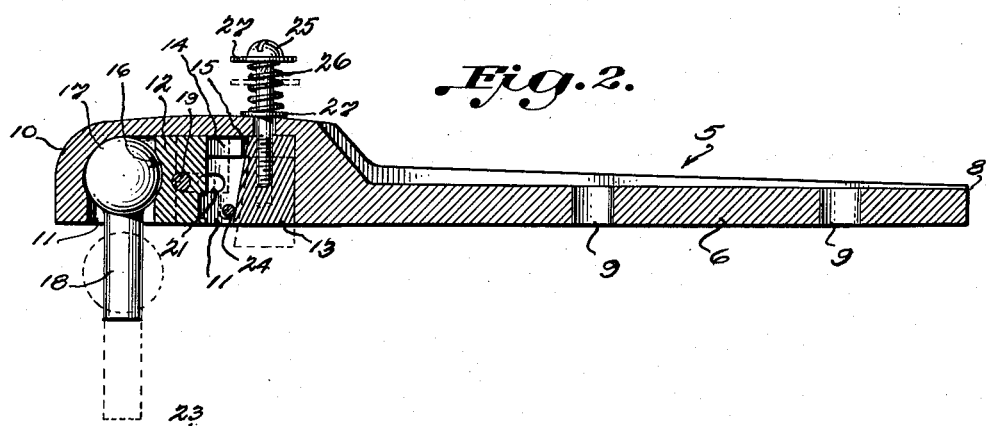
Figure 2 is a vertical sectional view taken substantially on line 2—2 of Figure 1.
Figure 3:
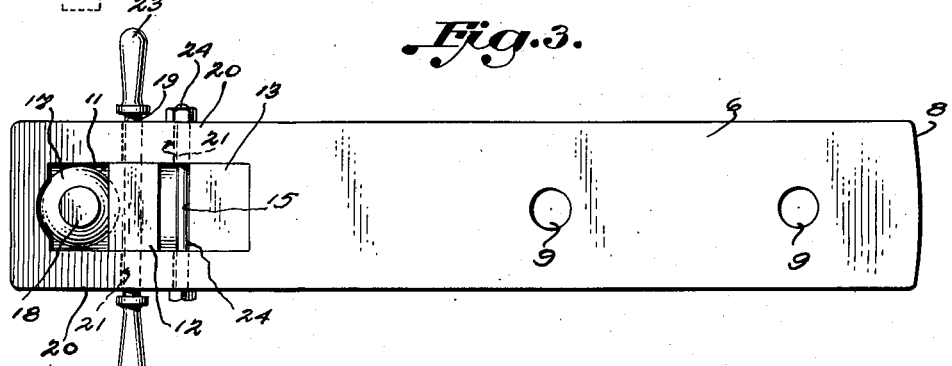
Figure 3 is a bottom plan view of the trailer hitch.

Referring to the drawing for a more detailed description thereof, the new and improved trailer hitch is generally designated by the reference numeral 5 and comprises an elongated rectangular-shaped drawbar 6 of the preferred shape and size illustrated in Figures 1 and 2 of the drawing. The major portion of the length of the drawbar 6 is reduced in thickness as indicated at 7, this reduced portion providing an end 8 which is adapted to be secured to the vehicle to be towed, not shown. One or more openings 9 are provided for receiving a locking bolt or the like, whereby the towing hitch may be firmly secured to the towed vehicle.

The other end 10 of the drawbar 6 is counterbored as indicated at 11 and carries therein a locking member 12 and wedge-shaped member 13. The locking member 12 is shown detached from the drawbar in Figure 4 of the drawing, and it will be noted that the same is substantially L-shaped in that there are provided integrally-formed leg members 14 adapted for engagement with the upper face 15 of the wedge-shaped member 13. The end of the locking member 12 opposite the leg members 14 is concaved, as indicated at 16 in Figure 2 of the drawing, this concaved face 16 being adapted to engage the ball-shaped head 17 of a locking stud 18. As is to be understood, the locking stud 18 is carried by the towing vehicle and, in accordance with the present invention, means have been provided for firmly locking and quickly releasing the stud 18 from the drawbar 6.

Figure 4:
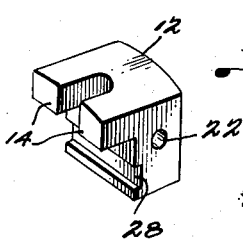
Figure 4 is a perspective view of the locking wedge, the same being detached from the trailer hitch.

The locking member 12 is slidable axially within the bore 11 and is maintained in slidable relation within said bore by means of a rod 19 which extends transversely through the locking member 12 and drawbar 6. For permitting this axial movement of the locking member 12 within the counterbore 11, each side wall 20 of said counterbore is formed with an elongated slot 21 through which the rod 19 passes. As shown in Figure 4 of the drawing, the locking member 12 has a bore 22 for receiving the rod 19. The projecting ends of the rod 19 carry handles 23 to facilitate axial movement of the locking member 12.

The wedge-shaped member 13 is used as the clamping and releasing means for the locking member 12. This wedge-shaped member 13 is also mounted within the counterbore 11 and is held in position by means of a pin 24 which extends transversely of said counterbore and which engages the tapered face 15 of the wedge-shaped member 13. A screw 25 is carried by the wedge-shaped member 13 and extends above the drawbar 6. A tension spring 26 surrounds the projecting end of the screw 25 and is interposed between a pair of washers 27. Downward pressure exerted on the screw 25 will move the wedge-shaped member 13 downwardly to the dotted-line position shown in Figure 2 of the drawing, and upon release of pressure on said screw, the spring 26 will return the member 13 to its normal position.

It is believed that the operation of the improved trailer hitch is obvious from the above description when taken in connection with the accompanying drawing. In order to clamp the ball-shaped head 17 of the stud 18, the wedge-shaped member 13 is first moved to the dotted-line position shown in Figure 2 of the drawing by exerting downward pressure on the screw 25. This downward movement of the wedge-shaped member 13 releases its contact with the leg members 14 of the locking member 12 so that said locking member can be moved axially in a direction toward the member 13 by means of a pulling action on the handles 23. The ball-shaped head 17 can then be received within the counterbore. Pressure on the screw 25 is then released and the tension of the spring 26 will draw the member 13 upwardly to the full-line position shown in Figure 2.

As the member 13 moves upwardly, its tapered face 15 will be brought into engagement with the leg members 14 of the locking member 12, thus causing said locking member to be moved toward the ball-shaped head 17 until its concaved face 16 abuts the same. The locking member 12 and the wedge-shaped member 13 are designed so that sufficient pressure will be exerted on the ball-shaped head 17 of the stud 18 to firmly clamp and lock said stud against movement. The same procedure is employed when desiring to detach the stud from the trailer hitch.

Aside from its aforementioned function of retaining the locking member 12 in its ball head-locking position (Fig. 2) the depressible wedge member 13 also functions to hold the locking member 12 in inoperative retracted position, as for instance when the ball head is to be located in the recess 11. This will be obvious from an inspection of Fig. 2, from which it is evident that when the wedge 13 is in the dotted line position and the locking member 12 has been moved rearwardly (to right in Fig. 2) the legs of the locking member 12 will overlie the top of the flat top of wedge 13. In this position an intermediate portion of the wedge-actuating screw 25 will be received in the space between the locking member legs 14. Thus release of downward pressure on screw 25 enables spring 26, acting through the wedge 13, to clamp the locking member legs tightly between the flat top of the wedge 13 and the top surface of the recess 11 until such a time as ball 17 has been located in recess 11. When this has been accomplished the locking member 12 is moved by handles 23 to the full line position of Fig. 2, and the thus released wedge 13 is returned by spring 26 to its full line (locking member-retaining) position shown.

The relative sizes of the counterbore 11, locking member 12 and wedge-shaped member 13 are such that different sizes of studs may be conveniently accommodated. It is to be further understood that the stud 18 may be of different shapes, the one herein illustrated being of the type which is receivable within an opening in the rear end of the towing vehicle. In order to accommodate towing studs of different sizes, one face of the locking member 12 is channeled, as indicated at 28, this channel-shaped portion moving into engagement with the pin 24 when the locking member is moved axially toward the wedge-shaped member 13.

It is obvious that many changes may be made in the details of construction without departing from the spirit of the invention as set forth in the appended claims.

I claim:

1. In a trailer hitch, a drawbar having a body member with one end adapted to be secured to a vehicle, the other end of said body member being formed with a substantially rectangular-shaped recess for receiving a towing stud, a locking member slidable in said recess for clamping said stud, and a tapered wedge movable vertically in said recess to permit axial movement of said locking member for releasing said stud, an operating stem carried by said wedge and projecting through said body from said recess, yielding means acting against said wedge to normally maintain said wedge in a position to hold the locking member in stud-engaging position, said locking member having a slot opening from its wedge-engaging end, said slot receiving the wedge-actuating pin when the wedge and locking member have been retracted to their inoperative positions, whereby the yielding means functions to cause the proximate end of the wedge to transversely engage the locking member to frictionally tend to hold it in retracted stud clearing position.

2. In a trailer hitch, a drawbar having a body member with one end adapted to be secured to a vehicle, the other end of said body member being formed with a substantially rectangular-shaped recess for receiving a towing stud, a rod extending transversely of said recess having limited movement in an elongated slot formed in each side wall of said body member, a locking member carried by said rod, a tapered wedge movable vertically in said recess for releasing said locking member, a spring-pressed plunger carried by said wedge for operating the same, said wedge operable vertically within the recess to a position out of the path of said locking member when the latter is moved horizontally within the recess to release the stud, said locking member having a pair of rearwardly extending legs adjacent its upper end, the legs of the locking member moving to a position between the top of the wedge and the underside of the recess, whereby the spring pressed plunger upon release frictionally retains the locking member in inoperative position.

3. In a trailer hitch, a draw bar having a body member with one end adapted to be secured to a vehicle, the other end of said body member being formed with an elongated surface recess for receiving a towing stud, stud-retaining means lineally movable in said recess to and from operative position, separate locking means shiftable transversely in said recess and engageable with said stud-retaining means to retain it in operative position, said separate locking means being sustained by one recess end wall for holding the locking means in operative position, yielding means tending to actuate the locking means to operative position, said stud-retaining means having a rearwardly extending top flange engageable with said stud locking means when the latter is in operative position, and said rearwardly extending flange of the retaining means overlying one end of said locking means when both of said means are in inoperative position whereby the yielding actuating means of the locking means acts through the latter to frictionally retain the retaining means in inoperative position.

HARRY BLUE.

REFERENCES CITED

The following references are of record in the file of this patent:

UNITED STATES PATENTS

| Number | Name | Date |
|---|---|---|
| 1,240,995 | Menhall et al. | Sept. 25, 1917 |
| 2,237,031 | Gilmore | Apr. 1, 1941 |
| 2,377,368 | Polstra | June 5, 1945 |

FOREIGN PATENTS

| Number | Country | Date |
|---|---|---|
| 722,441 | France | Dec. 29, 1931 |
| 794,538 | France | Dec. 12, 1935 |